US008352852B2

(12) United States Patent
Heute

(10) Patent No.: US 8,352,852 B2
(45) Date of Patent: Jan. 8, 2013

(54) PORTAL REPLAY AND FORESEE

(75) Inventor: Thomas Heute, Charmey (CH)

(73) Assignee: Red Hat, Inc., Raleigh, NC (US)

( * ) Notice: Subject to any disclaimer, the term of this patent is extended or adjusted under 35 U.S.C. 154(b) by 424 days.

(21) Appl. No.: 12/541,389

(22) Filed: Aug. 14, 2009

(65) Prior Publication Data

US 2011/0041055 A1    Feb. 17, 2011

(51) Int. Cl.
*G06F 17/00* (2006.01)
(52) U.S. Cl. ...................................... 715/229
(58) Field of Classification Search .................. 715/229, 715/243, 273
See application file for complete search history.

(56) References Cited

U.S. PATENT DOCUMENTS

| | | | |
|---|---|---|---|
| 7,543,005 B1 * | 6/2009 | Edelman et al. ...................... 1/1 |
| 7,810,036 B2 * | 10/2010 | Bales et al. ..................... 715/742 |
| 2003/0005041 A1 * | 1/2003 | Ullmann et al. .............. 709/203 |
| 2004/0215718 A1 * | 10/2004 | Kazmi et al. .................. 709/203 |
| 2005/0097160 A1 * | 5/2005 | Stob .............................. 709/200 |
| 2005/0192936 A1 * | 9/2005 | Meek et al. ........................ 707/3 |
| 2006/0271526 A1 * | 11/2006 | Charnock et al. .................... 707/3 |
| 2007/0050175 A1 * | 3/2007 | Schmelzer et al. ........... 702/186 |
| 2007/0067714 A1 * | 3/2007 | Lin ................................ 715/513 |
| 2007/0168350 A1 * | 7/2007 | Utiger ............................ 707/10 |
| 2007/0215718 A1 * | 9/2007 | Saidman ....................... 239/135 |
| 2007/0233569 A1 * | 10/2007 | Kelley et al. ..................... 705/14 |
| 2008/0005164 A1 * | 1/2008 | Yee et al. ..................... 707/104.1 |
| 2008/0059532 A1 * | 3/2008 | Kazmi et al. ............... 707/104.1 |
| 2008/0168085 A1 * | 7/2008 | Chun et al. .................... 707/102 |
| 2008/0177755 A1 * | 7/2008 | Stern et al. .................... 707/100 |
| 2008/0320225 A1 * | 12/2008 | Panzer et al. .................. 711/130 |
| 2009/0019019 A1 * | 1/2009 | Jones et al. ........................ 707/4 |
| 2009/0055460 A1 * | 2/2009 | Hicks et al. .................... 709/201 |
| 2009/0106674 A1 * | 4/2009 | Bray et al. ..................... 715/762 |
| 2009/0117921 A1 * | 5/2009 | Beydler et al. ................ 455/457 |
| 2009/0210806 A1 * | 8/2009 | Dodson et al. ................ 715/760 |
| 2010/0095197 A1 * | 4/2010 | Klevenz et al. ............... 715/234 |

OTHER PUBLICATIONS

"Versionista: Track changes to any Web site", accessed at: http://versionista.com/ on Jul. 20, 2009, 2 pages.
Pash, A., "Track website changes with Feedwhip", accessed at: http://lifehacker.com/software/news-aggregation/track-website-changes-with-feedwhip-157963.html on Jul. 20, 2009, last updated Mar. 2, 2006, 1 page.
"Web page monitoring monitor changes pages webpages changedetect", accessed at: http://www.changedetect.com/ on Jul. 20, 2009, last updated May 10, 2009, 2 pages.
"Internet Archive Forums: View Post", accessed at: http://www.archive.org/iathreads/post-view.php?id=243665 on Jul. 20, 2009, updated Apr. 24, 2009, 1 page.

(Continued)

*Primary Examiner* — Laurie Ries
(74) *Attorney, Agent, or Firm* — Lowenstein Sandler PC

(57) ABSTRACT

Some embodiments of a system and a method to allow users to review prior and future versions of a website have been presented. In one embodiment, a processing module running on a web portal server tracks changes to a website hosted on the web portal server by recording the changes in a content repository of the web portal server. A graphical user interface (GUI) module running on the web portal server may generate user interface control to allow a user to review, depending on rights granted to the user, prior versions of the website and future versions of the website, which may be constructed using the changes tracked.

22 Claims, 7 Drawing Sheets

OTHER PUBLICATIONS

"Official Google Blog: Went Walkabout. Brought back Google Wave.", accessed at: http://googleblog.blogspot.com/2009/05/went-walkabout-brought-back-google-wave.html on Jul. 20, 2009, last updated May 28, 2009, 5 pages.

Wang, Z., "Incremental Web Search: Tracking Changes in the Web", Department of Computer Science, Courant Institute of Mathematical Sciences, New York University, May 2006, pp. 50-69.

* cited by examiner

PORTAL REPLAY AND FORESEE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention relate to website management, and more specifically to providing a way for users to review prior and future versions of a website, which may include a major change or one or more smaller incremental updates.

BACKGROUND

In website development, an owner of a website often makes changes to the website from time to time. For example, the owner may add or remove certain components to or from the website for various purposes, such as to correct information on the website, to update the website, to improve the website in response to feedback received, etc. The components added or removed may be part of a webpage in the website or an entire webpage in the website. For some websites of large organizations (e.g., an enterprise, a government agency, a university, etc.), multiple people may be authorized to make changes to the entire websites or part of the websites. It is generally helpful to gather information on the changes made to the website.

Conventionally, there are several website monitors available for users or subscribers to monitor a particular website of interest. These conventional website monitors are typically provided by a third party, not by the owner or the host of the website of interest. To monitor the website of interest, these conventional website monitors use a crawler, or other similar online search device, to periodically search the website of interest to determine if there has been any change made to the website. If there is a change in the website of interest, then these conventional website monitors may notify the users or subscribers of the change. Because these conventional website monitors are operated by the third party, they are not directly aware of the changes made, and they are not able to gather more comprehensive information on the changes to the website other than what has been changed in the website.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
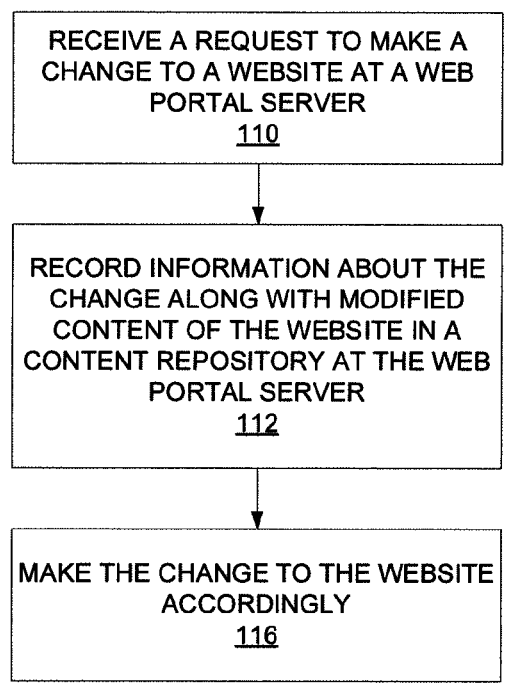
FIG. 1A illustrates a flow diagram of one embodiment of a method to track changes to a website.

Described herein are some embodiments of a method, an apparatus, and a system to allow users to review prior and future versions of a website. In one embodiment, a tracking module running on a web portal server tracks changes to a website hosted on the web portal server. A graphical user interface (GUI) module running on the web portal server may generate user interface control to allow a user to review, depending on rights granted to the user, prior versions of the website and future versions of the website, which may be constructed using the changes tracked. More details of some embodiments of how to track changes to a website and how to allow user review of various versions of the website are described below.

Note that the tracking module runs on the web portal server to track changes to the website hosted on the web portal server. Thus, the tracking module is directly aware of changes made to the website. In contrast, some conventional website monitors discussed above are not directly aware of the changes made to the website under monitor because they are provided by a third party. Thus, the information provided by the tracking module is more comprehensive than the information provided by some conventional website monitors. For example, the tracking module is capable of recording who makes which changes, when changes are made, etc. The conventional website monitors discussed above cannot gather such information. Furthermore, because the tracking module runs on the web portal server, there is no need to use a crawler, or other similar search device, to periodically check the website in order to discover changes made to the website. Another advantage of some embodiments of the present invention is the capability to foresee future changes to be made to the website. Because the conventional website monitors rely on crawling released versions of the website in order to discover changes made, the conventional website monitors are unable to foresee future changes to be made to the website.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates a flow diagram of one embodiment of a method to track changes to a website. The method may be performed by processing logic that may comprise hardware (e.g., circuitry, dedicated logic, programmable logic, microcode, etc.), software (such as instructions run on a processing device), firmware, or a combination thereof. For instance, the web portal server 200 illustrated in FIG. 2 may perform at least part of the method in some embodiments.

Initially, processing logic receives a request to make a change to a website at a web portal server (processing block 110). The website is hosted by the web portal server. The request may be made by someone authorized to change the website, such as an owner of the website, a system administrator, etc. In some embodiments, the change may include a change to the content of the website (e.g., articles posted on the website, images displayed on the website, hyperlinks displayed on the website, etc.), and/or a change to the format or layout of the website (e.g., color scheme of the website, locations of various components of the website, etc.). Note that some of these changes may be effective immediately, while some of these changes may be made on a later day.

In some embodiments, processing logic records information about the change (which may be referred to as metadata) along with the modified content of the website in a content repository (e.g., Java Content Repository (JCR)). The information about the change may include who makes the request (e.g., user name of the one requesting the change), when the change is to be made to the website (e.g., date and time the change goes into effect), etc. (processing block 112). The content repository may be stored in a storage device (e.g., a computer-readable storage medium) of the web portal server. An exemplary embodiment of the content repository is shown in FIG. 1C.

In some embodiments, processing logic makes the change to the website accordingly (processing block 116). That is, at the date and time specified, processing logic may implement the change to the website and release the updated website publicly. In website development, it would be helpful for website developers to be able to review prior changes made to the website, which may be referred to as replaying the history of the website, and to review future changes to be made to the website, which may be referred to as foreseeing the future of the website. Such reviews are useful in debugging and quality control of the website. One embodiment of a method to allow users to review both prior and future versions of a website is discussed below.

Figure 1B:
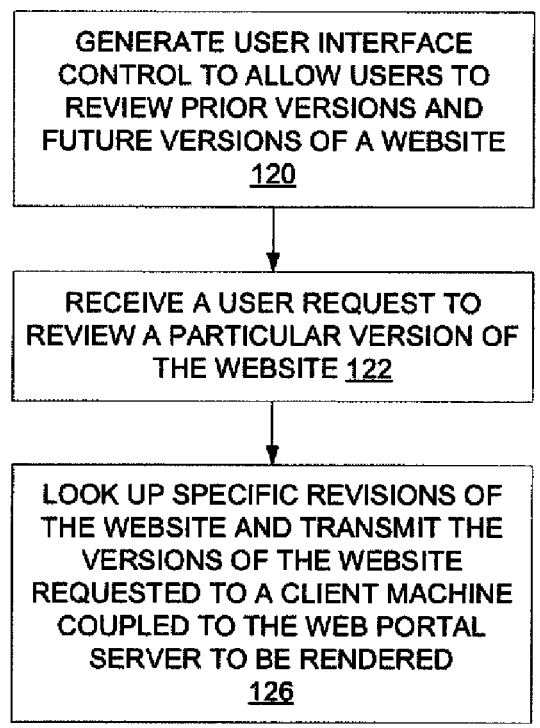
FIG. 1B illustrates a flow diagram of one embodiment of a method to allow users to review prior and future versions of a website.
Figure 1C:
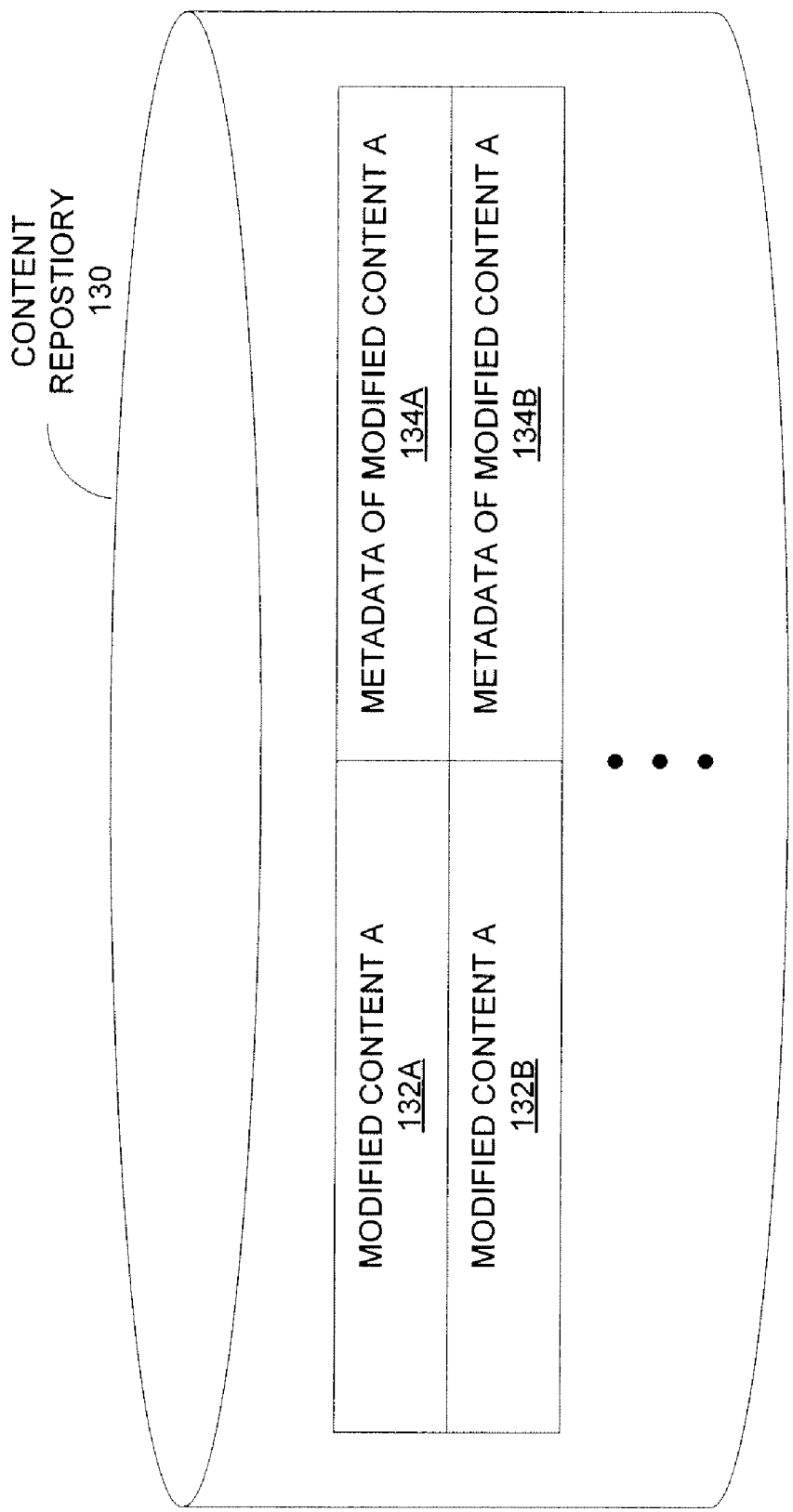
FIG. 1C illustrates one embodiment of a content repository of a web portal server.

FIG. 1B illustrates a flow diagram of one embodiment of a method to allow users to review prior and future versions of a website. The method may be performed by processing logic that may comprise hardware (e.g., circuitry, dedicated logic, programmable logic, microcode, etc.), software (such as instructions run on a processing device), firmware, or a combination thereof. For instance, the web portal server 200 illustrated in FIG. 2 may perform at least part of the method in some embodiments.

Initially, processing logic generates user interface control to allow users to review prior versions and future versions of a website (processing block 120). In some embodiments, the user interface control includes a tool bar with various buttons, such as a forward button, a backward button, a stop button, etc. One exemplary embodiment of the user interface control is shown in FIG. 1D.

Processing logic may receive a user request to review a particular version of the website (processing block 122). For instance, a user may submit a request to review one or more versions of the website using the user interface control generated (e.g., by actuating a backward button of the tool bar). In response to the user request, processing logic looks up specific revisions of the website and transmits the requested versions of the website to a client machine coupled to the web portal server to be rendered (processing block 126). The user can review the requested version of the website using a network access application (e.g., an Internet browser) running on the client machine.

FIG. 1C illustrates one embodiment of a content repository 130 of a web portal server. As previously discussed, the content repository 130 may be stored in a storage device (e.g., a hard drive) of the web portal server. The content repository 130 stores a number of entries, each corresponding to a change (or modified content) to the website, such as modified content 132A and 132B. Stored along with each entry is metadata of the corresponding change, such as metadata 134A and 134B. The metadata may include a maker of the change, a date on which the change is made (or to be made), type of the change, etc. Note that the metadata may include more or less information on the modified content than those illustrated in FIG. 1C in some embodiments.

Figure 1D:
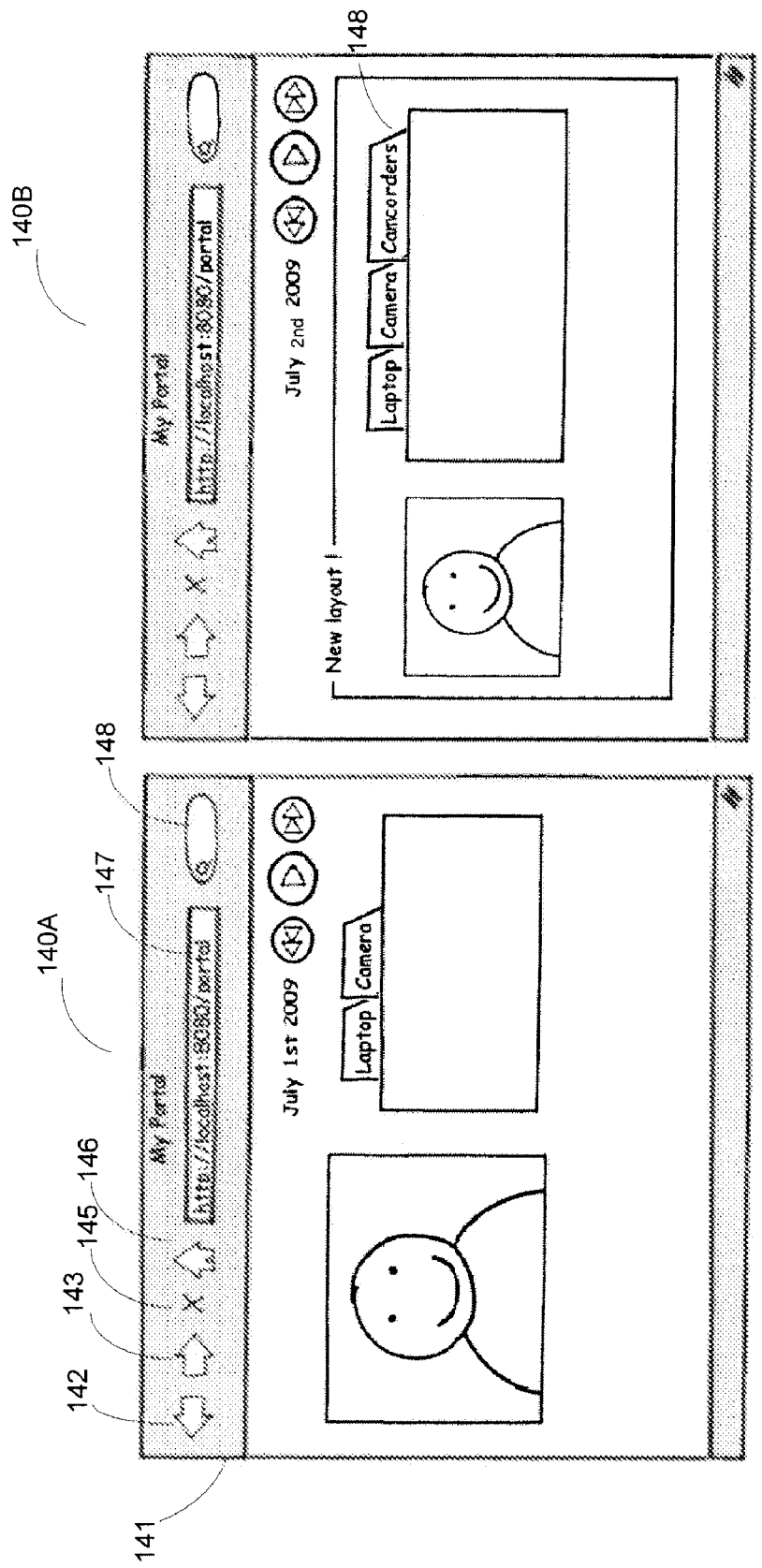
FIG. 1D illustrates one embodiment of user interface control usable in some embodiments of the invention.

FIG. 1D illustrates one embodiment of user interface control usable in some embodiments of the invention. In window 140A, an earlier version of an exemplary website at http://localhost:8080/portal dated Jul. 1, 2009 is displayed. In window 140B, a later version of the same website dated Jul. 2, 2009 is displayed. The windows 140A and 140B may be displayed by a client machine coupled to a web portal server hosting the website. In each of the windows 140A and 140B, some user interface control is displayed above the website displayed. The user interface control according to one embodiment of the invention includes a tool bar, such as toolbar 141, which is displayed above the website in window 140A. Since the toolbars in both windows 140A and 140B are substantially the same, the following discussion will focus on the toolbar 141 in window 140A to simply the description.

In some embodiments, the tool bar 140A includes a backward button 142, a forward button 143, a stop button 145, a home button 146, a Universal Resource Locator (URL) entry field 147, and a search text entry field 148. A user can actuate (e.g., by using a mouse) the backward button 142 to request a version of the website older than the one currently displayed. Likewise, the user can actuate the forward button 143 to request a version of the website newer than the one currently displayed. For example, the user may actuate the forward button 143 to request the version of the website dated Jul. 2, 2009, which is then displayed as shown in window 140B. In this example, the newer version of the website has a new layout and a "camcorders" tab 148 added to the website. Furthermore, the user may hold down either the backward button 142 or the forward button 143 to request a continuous sequential display (similar to a slide show) of consecutive older or newer versions of the website, respectively. To stop the continuous sequential display of consecutive versions of the website, the user may release the backward button 142 or the forward button 143, and actuate the stop button 145.

To review different versions of another website, the user may enter the URL of the other website in the URL entry field 147 and then press the "Enter" button on a keyboard. Then the request to review the other website may be submitted to the web portal server, which may transmit the requested website to the client machine. Furthermore, the user may enter an alphanumeric search term (e.g., a word, a number, a phrase, etc.) in the search text entry field 148 in order to search for the alphanumeric search term in the version of the website currently displayed. In some embodiments, the user may actuate the home button 146 to request a current version of a website previously designated as the homepage of the user.

Note that other user interface control, such as additional buttons, drop-down menus, text entry fields, scroll bars, etc., may be included in the tool bar 141 in different embodiments. In other embodiments, the tool bar 141 may include fewer buttons and/or text entry fields than those shown in FIG. 1D. Furthermore, the buttons and text entry fields discussed above may be in designs, forms, shapes, or sizes different from those shown in FIG. 1D in some embodiments.

Figure 2:
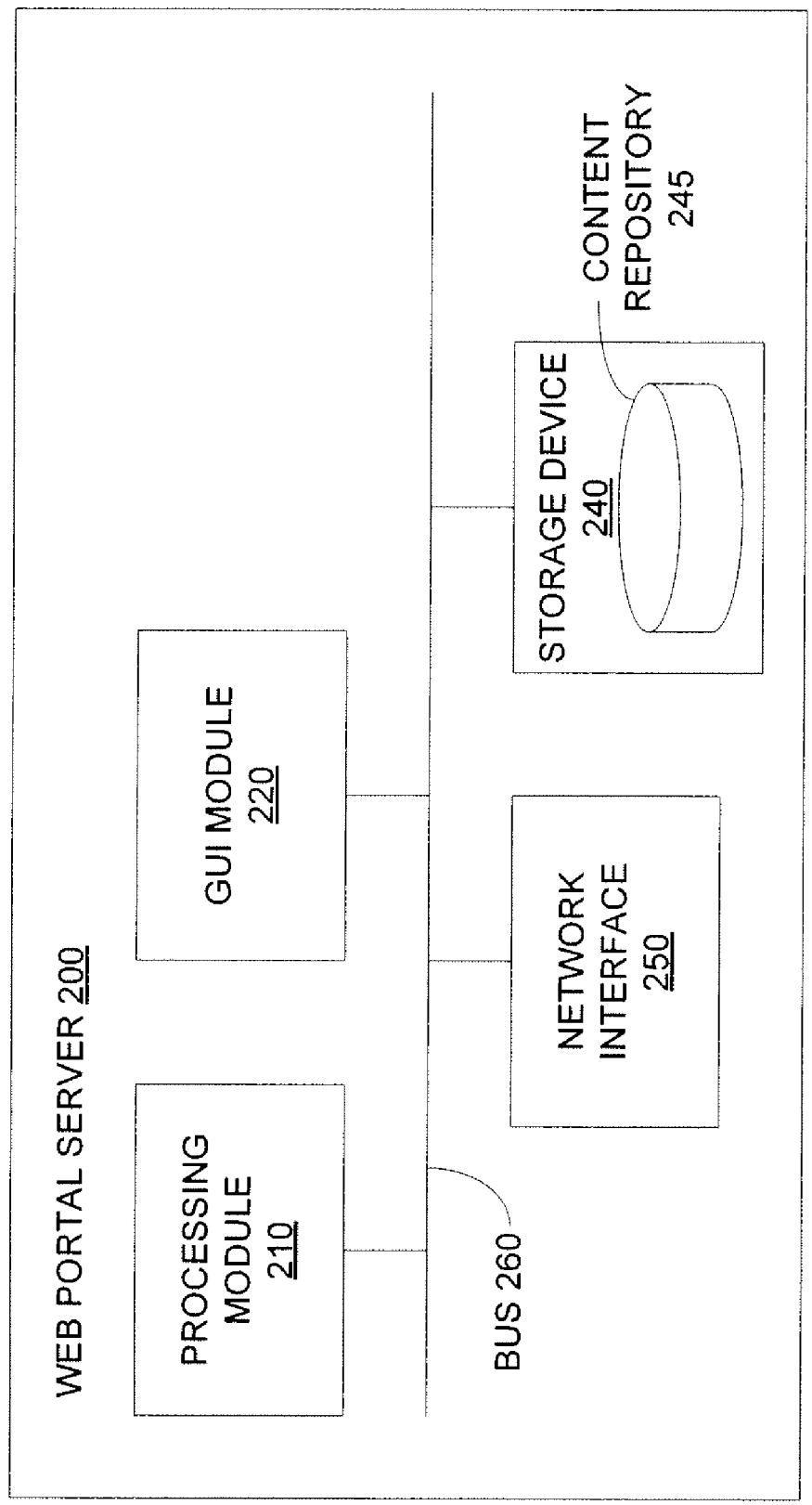
FIG. 2 illustrates one embodiment of a web portal server.

FIG. 2 illustrates one embodiment of a web portal server. The web portal server 200 includes a processing module 210, a GUI module 220, a storage device 240, and a network interface 250, coupled to each other via a bus 260. The storage device 240 further stores a content repository 245, such as Java Content Repository. In some embodiments, the processing module 210 records changes made or to be made to a website hosted by the web portal server 200 by storing the change along with its metadata in the content repository 245. For example, a user may request to make a change to a website at a particular time or date. The processing module 210 may record the modified content, as well as metadata of the modified content (e.g., the user's identity and the particular time and/or date the change is to be made), in the content repository 245 stored in the storage device 240. The information recorded in the content repository 245 is then used to provide different versions of the website in response to user's website review request as follows.

In some embodiments, the GUI module 220 generates user interface control (such as those shown in FIG. 1D) to allow a user to submit a request to review one or more particular versions of the website. These versions may include prior versions of the website and/or future versions of the website. Note that the web portal server 200 may require the requesting user to possess certain right or privilege before allowing such review. For instance, the web portal server 200 may limit the review of future versions of the website to website owners and system administrators only, while allowing all users to review prior versions of the website.

In response to a user request to review a particular version of the website, the processing module 210 may access the content repository 245 to retrieve the corresponding modified contents of the website. In addition, processing module 210 may retrieve the corresponding metadata of the modified content. Then the web portal server 200 may transmit the requested version of the website using the network interface 250 to a client machine used by the user. Furthermore, the web portal server 200 may transmit the corresponding metadata to the client machine as well, thus, providing more information on the changes to the website than some conventional website monitors discussed above. Details of some embodiments of the operations performed by various modules of the web portal server 200 have been discussed above with reference to FIGS. 1A and 1B.

Figure 3:
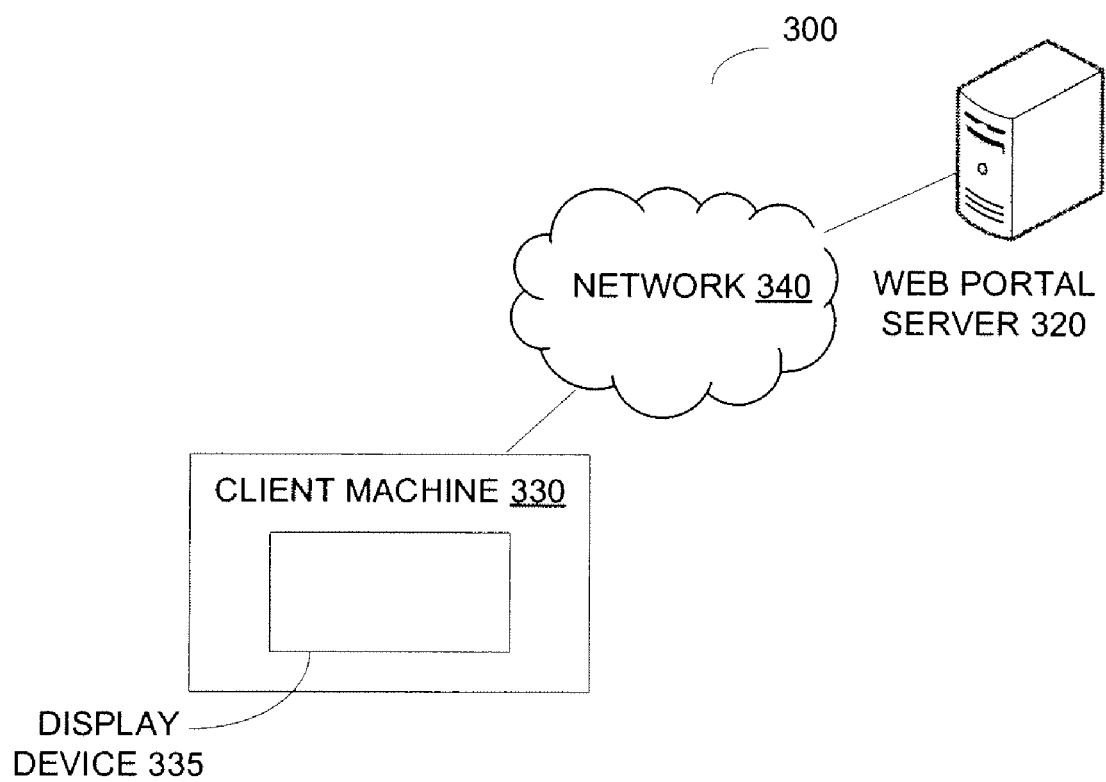
FIG. 3 illustrates one embodiment of a system usable in some embodiments of the invention.

FIG. 3 illustrates one embodiment of a system usable with some embodiments of the invention. The system 300 includes a web portal server 320 and a client machine 330, coupled to each other via a network 340. One embodiment of the web portal server 320 has been discussed in details with reference to FIG. 2. The network 340 may include various networks, such as a local area network (LAN), Ethernet, wide area network (WAN), Internet, etc. Note that there may be more devices coupled to the network 340 in other embodiments, such as additional servers, client machines, etc. The client machine 330 may be implemented using various computing devices, such as personal computers, laptop computers, personal digital assistants, cellular telephone, special-purpose computers installed in kiosks, etc. The client machine 330 further includes a display device 335 (e.g., a liquid crystal display (LCD) screen).

In some embodiments, the display device 335 of the client machine 330 displays user interface control generated by the web portal server 320 to allow users to submit website review requests. The user interface control may be rendered using a network access application running on the client machine 330, such as an Internet browser. Some embodiments of the user interface control are shown in FIG. 1D. A user may submit a request to review a particular version of a website hosted by the web portal server 320 via the client machine 330 to the web portal server 320 using the user interface control. In response to the user request, the web portal server 320 may construct the requested version of the website as discussed above with reference to FIGS. 1B and 2, and then send the requested version of the website via the network 340 to the client machine 330. The client machine 330 may display or render the requested version of the website using the display device 335.

Figure 4:
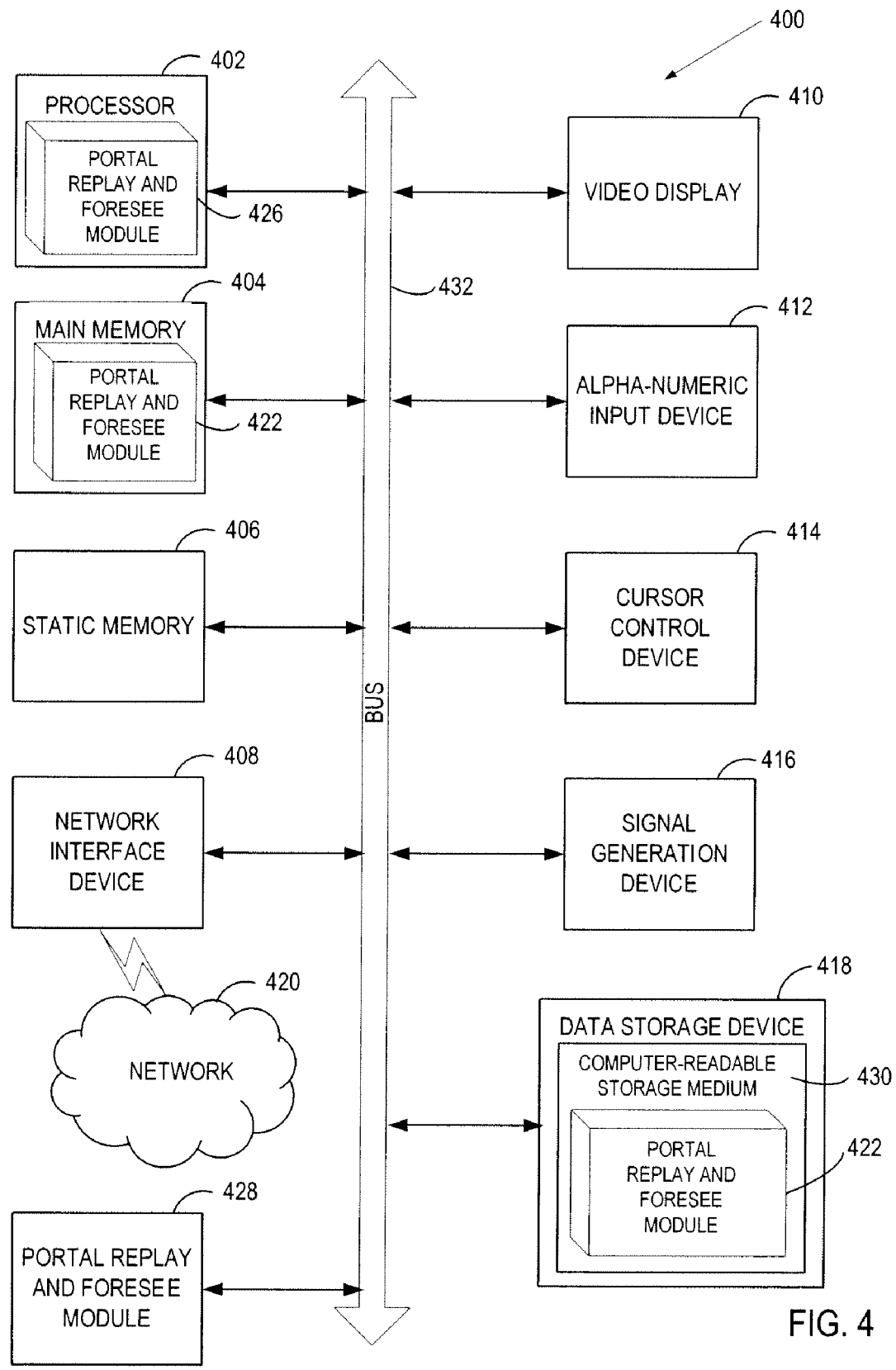
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the portal replay and foresee module 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., portal replay and foresee module 422) embodying any one or more of the methodologies or functions described herein. The portal replay and foresee module 422 may also reside, completely or at least partially, within the main memory 404 and/or within the processing device 402 during execution thereof by the computer system 400, the main memory 404 and the processing device 402 also constituting computer-accessible storage media. The portal replay and foresee module 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The portal replay and foresee module 428, components and other features described herein (for example, in relation to FIG. 2) can be implemented as discrete hardware components or integrated into the functionalities of hardware components, such as ASICS, FPGAs, DSPs, or similar devices. In addition, the portal replay and foresee module 428 can be implemented as firmware or functional circuitries within hardware devices. Further, the portal replay and foresee module 428 can be implemented in any combination of hardware devices and software components.

Thus, some embodiments of a system and a method to allow user review of prior and future versions of a website have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   tracking, by a processing module running on a web portal server, a plurality of changes to a website hosted on the web portal server by recording the plurality of changes in a content repository in the web portal server;
   generating, by a graphical user interface (GUI) module, a user interface control to allow a user to review, depending on a right granted to the user, a plurality of prior versions of the website and a plurality of future versions of the website, wherein the plurality of prior versions of the website and the plurality of future versions of the website are constructed using the plurality of changes;
   presenting, in the GUI, a first version of the website in response to a user request; and
   in response to the user actuating a portion of the user interface control, selecting, by the processing module, a second version of the website that is sequential to the first version of the website, wherein the second version of the website is selected from one of the plurality of prior versions of the website and the plurality of future versions of the website.

2. The method of claim 1, wherein the plurality of changes comprise a plurality of changes to the website made in the past and a plurality of changes to the website to be made in the future.

3. The method of claim 1, further comprising:
   transmitting the first version of the website in response to a user request, by a network interface running on the web portal server, to a client machine coupled to the web portal server to be rendered by the client machine.

4. The method of claim 1, further comprising:
   recording the plurality of changes in the content repository in a storage device within the web portal server along with metadata of the plurality of changes, wherein the metadata comprises, for each of the plurality of changes, who makes a respective change.

5. The method of claim 1, further comprising:
   recording the plurality of changes in the content repository in a storage device within the web portal server along with metadata of the plurality of changes, wherein the metadata comprises, for each of the plurality of changes, when a respective change is made.

6. The method of claim 1, wherein the plurality of changes comprises a change to a layout of the website.

7. The method of claim 1, wherein the plurality of changes comprises a change to content of the website.

8. An apparatus comprising:
a processing module executable on a web portal server, to record a plurality of changes to a website hosted on the web portal server in a content repository of the web portal server; and
a graphical user interface (GUI) module, to generate a user interface control to allow a user to review a plurality of prior versions of the website and a plurality of future versions of the website, depending on a right granted to the user, and to present a first version of the website in response to a user request,
wherein the processing module is operable to select a second version of the website that is sequential to the first version of the website in response to the user actuating a portion of the user interface control, wherein the second version of the website is selected from one of the plurality of prior versions of the website and the plurality of future versions of the website.

9. The apparatus of claim 8, further comprising:
a storage device to store the content repository, wherein the plurality of changes comprise a plurality of changes to the website made in the past and a plurality of changes to the website to be made in the future.

10. The apparatus of claim 8, further comprising:
a network interface to transmit the first version of the website in response to a user request to a client machine coupled to the web portal server, wherein the first version of the website is to be rendered by the client machine.

11. The apparatus of claim 8, wherein, for each of the plurality of changes, the tracking module is operable to record metadata of a respective change with the change in the content repository, wherein the metadata comprises who makes the respective change.

12. The apparatus of claim 8, wherein, for each of the plurality of changes, the tracking module is operable to record metadata of a respective change with the change in the content repository, wherein the metadata comprises when the respective change is made.

13. The apparatus of claim 8, wherein the plurality of changes comprises a change to a layout of the website.

14. The apparatus of claim 8, wherein the plurality of changes comprises a change to content of the website.

15. An system comprising the apparatus of claim 8, further comprising:
a client machine coupled to the web portal server via a network, the client machine further comprises a display device to render the first version of the website requested by the user.

16. A non-transitory computer-readable storage medium embodying instructions that, when executed by a processor, will cause the processor to perform a method comprising:
tracking, by a processing module running on a web portal server, a plurality of changes to a website hosted on the web portal server by recording the plurality of changes in a content repository in the web portal server;
generating, by a graphical user interface (GUI) module, a user interface control to allow a user to review a plurality of prior versions of the website and a plurality of future versions of the website, wherein the plurality of prior versions of the website and the plurality of future versions of the website are generated depending on a right granted to the user;
presenting, in the GUI, a first version of the website in response to a user request; and
in response to the user actuating a portion of the user interface control, selecting, by the processing module, a second version of the website that is sequential to the first version of the website, wherein the second version of the website is selected from one of the plurality of prior versions of the website and the plurality of future versions of the website.

17. The non-transitory computer-readable storage medium of claim 16, wherein the plurality of changes comprise a plurality of changes to the website made in the past and a plurality of changes to the website to be made in the future.

18. The non-transitory computer-readable storage medium of claim 16, wherein the method further comprises:
transmitting the first version of the website in response to a user request, by a network interface running on the web portal server, to a client machine coupled to the web portal server to be rendered by the client machine.

19. The non-transitory computer-readable storage medium of claim 16, further comprising:
recording the plurality of changes in the content repository in a storage device within the web portal server along with metadata of the plurality of changes, wherein the metadata comprises, for each of the plurality of changes, who makes a respective change.

20. The non-transitory computer-readable storage medium of claim 16, further comprising:
recording the plurality of changes in the content repository in a storage device within the web portal server along with metadata of the plurality of changes, wherein the metadata comprises, for each of the plurality of changes, when a respective change is made.

21. The non-transitory computer-readable storage medium of claim 16, wherein the plurality of changes comprises a change to a layout of the website.

22. The non-transitory computer-readable storage medium of claim 16, wherein the plurality of changes comprises a change to content of the website.

* * * * *